United States Patent [19]
Sekido et al.

[11] Patent Number: 5,294,406
[45] Date of Patent: Mar. 15, 1994

[54] WASTE SOLUTION TREATMENT APPARATUS

[75] Inventors: Masayasu Sekido, Osaka; Akira Yoda, Kaisei, both of Japan

[73] Assignee: Fuji Photo Film Co., Ltd., Kanagawa, Japan

[21] Appl. No.: 933,912

[22] Filed: Aug. 27, 1992

Related U.S. Application Data

[63] Continuation of Ser. No. 430,553, Nov. 1, 1989, abandoned.

[30] Foreign Application Priority Data

Nov. 2, 1988 [JP] Japan .................. 63-279146
Nov. 24, 1988 [JP] Japan .................. 63-297370

[51] Int. Cl.$^5$ .................................. B01J 8/02
[52] U.S. Cl. .................. 422/109; 422/198; 422/199; 422/220; 431/268; 431/326
[58] Field of Search .............. 422/109, 173, 174, 176, 422/177, 178, 182, 198, 199, 211, 212, 220; 431/5, 7, 11, 268, 326

[56] References Cited

U.S. PATENT DOCUMENTS

| | | | |
|---|---|---|---|
| 1,193,798 | 8/1916 | Landis . | |
| 1,347,631 | 7/1920 | Herck | 422/211 |
| 1,994,932 | 3/1935 | Vidal . | |
| 3,199,505 | 8/1965 | Lloyd | 431/268 |
| 3,251,656 | 5/1966 | Edwards | 422/176 |
| 3,456,603 | 7/1969 | Studler | 422/182 |
| 3,469,947 | 9/1969 | Drury . | |
| 3,549,333 | 12/1970 | Tabak | 422/182 |
| 3,690,840 | 9/1972 | Volker | 422/182 |
| 3,837,786 | 9/1974 | Evans et al. | 422/182 |
| 4,213,766 | 7/1980 | Wyatt | 422/176 |
| 4,322,387 | 3/1982 | Virk et al. | 422/174 |
| 4,415,533 | 11/1983 | Kurotori et al. . | |
| 4,538,899 | 9/1985 | Landa et al. . | |
| 4,600,291 | 7/1986 | Ohtsuka et al. . | |
| 4,697,912 | 10/1987 | Sato et al. . | |
| 4,702,892 | 10/1987 | Betz | 422/174 |
| 4,719,090 | 7/1988 | Masaki | 422/171 |
| 4,804,520 | 2/1989 | Richtenburg et al. . | |

FOREIGN PATENT DOCUMENTS

3123872 1/1982 Fed. Rep. of Germany .
2135242 1/1984 United Kingdom .

*Primary Examiner*—Peter Kratz
*Attorney, Agent, or Firm*—Sughrue, Mion, Zinn, Macpeak & Seas

[57] ABSTRACT

An apparatus for treating a waste solution which contains a nonvolatile substance such as a toner used for development of an electrophotographic film and a liquid which is difficult to volatilize at normal temperatures such as isoparaffin. The waste solution heated from below a multiplicity of vertically elongated guide chambers disposed in a waste solution container rises upward through the guide chambers in the form of vapor and is oxidized by a catalyst. After ignition, even if the heating of the waste solution by a heater is stopped, the waste solution in the waste solution container continues to be heated by oxidation heat.

18 Claims, 10 Drawing Sheets

WASTE SOLUTION TREATMENT APPARATUS

This is a continuation of application Ser. No. 07/430,553 filed Nov. 1, 1989, now abandoned.

BACKGROUND OF THE INVENTION

1. Field of the Invention

The present invention relates to a waste solution treatment apparatus using a catalyst.

The waste solution referred to in this specification is a volatile waste solution which is difficult to volatilize at normal temperatures and contains a nonvolatile substance. For instance, an excess developing solution for electrophotography which contains nonvolatile substances such as a toner and the like and employs as a solvent a volatile liquid, such as isoparaffin, which is difficult to volatilize at normal temperatures. Or a developing solution for a wet process copying machine, a microfilm developing solution, a cleaner for automobiles, a cleaning fluid, a developing solution for an electrophotographic process, and a developing solution for magnetography, and other waste solutions that are produced after the use of various liquids having similar components.

2. Statement of the Related Art

In addition to the most commonly practiced process using silver halide, magnetographic processes and an electrophotographic processes are known methods of recording an image.

The magnetographic process is carried out as follows: First, a magnetic latent image is formed on a drum coated with a recording layer formed of a magnetic substance. A developing solution having hydrocarbon as a principal component is then applied to this magnetic latent image. In consequence, the magnetic latent image is developed into a visible image by a resin toner containing a powdered magnetic substance dispersed in the developing solution, and the image after being recorded is transferred to transfer paper, thereby obtaining a copy.

The electrophotographic process is implemented as follows: First, an electrophotographic film electrically charged and is then exposed to light so as to form an electrostatic latent image on the electrophotographic film. Then, a developing solution having hydrocarbon as a principal component and containing electrically charged toner particles is applied to the electrophotographic film so as to convert the electrostatic latent image into a visible image. After the electrophotographic film is dried, the image is fixed.

Thus, in both of these processes, a developing solution containing toner particles is used, resulting in an excess developing solution being produced when the developing solution is applied to the drum or the electrophotographic film. Accordingly, it is necessary to treat this excess developing solution in some way or another.

Accordingly, if an arrangement is provided such that the excess developing solution is recovered into a developing solution tank via a return pipeline so as to be used a plurality of times, it becomes unnecessary to provide treatment immediately. However, if this measure is adopted. there is a drawback in that the arrangement of the apparatus becomes complicated. Moreover, even if the excess developing solution is used a plurality of times, the fatigued excess developing solution must be unavoidably treated as a waste solution eventually.

For this reason, as a method of treating such a waste solution, a method has been proposed in which a lower end of a core composed of a bundle of fibers, or the like, is immersed in the waste solution. The volatile liquid in the waste solution is allowed to move to an upper end of the core by means of the capillary phenomenon, and the volatile liquid is burnt (oxidized) by using a catalyst provided upwardly of the core. According to this method, since the aforementioned waste solution has hydrocarbon as a principal component, a major portion of the waste solution can be converted to carbon dioxide and water. Since no flame is produced during combustion, this method is very favorable in terms of safety and the designing of the apparatus.

However, it has become clear that, with the above described method using the core, in the case of a waste solution containing a nonvolatile substance such as the aforementioned toner, the nonvolatile substance adheres to the surface of the core in the form of tar and consequently prevents the rise of the volatile liquid. As a result, the volatile liquid is burnt insufficiently or ceases to burn at all within a short period of time. Hence, with this method, it is difficult to burn the waste solution continuously and completely.

In addition, as developing solutions such as those mentioned above, liquids whose boiling point is substantially higher (150°–200° C. or thereabouts) than a normal temperature (15° C.) are used to ensure safety, the developing solutions are very difficult to volatilize at a temperature close to room temperature. Accordingly, if an attempt is made to cause the volatile liquid in the waste solution to volatilize and burn the same in a state of vapor, it is necessary to heat the waste solution.

However, if heating is continued throughout the combustion, the energy cost associated with the apparatus becomes very large. In addition, since a measure must be provided to prevent the apparatus itself from reaching an abnormally high temperature by taking into account the radiation of resultant heat, the manufacturing costs of the apparatus increases significantly.

SUMMARY OF THE INVENTION

Accordingly, an object of the present invention is to provide a waste solution treatment apparatus which is capable of continuously treating a waste solution containing a nonvolatile substance and a volatile liquid which is difficult to volatilize at normal temperatures as in the case of various developing solutions mentioned above, thereby overcoming the above described drawbacks of the conventional art.

Another object of the present invention is to provide a waste solution treatment apparatus which eliminates the need to heat a waste solution continuously during the treatment thereof and is compact enough to be easily accommodated in a body of an electrophotographic system or the like.

A further object of the present invention is to provide a waste solution treatment apparatus which does not produce adverse effects on the treatment of a waste solution even when the waste solution is newly supplied during treatment.

To these ends, according to the present invention, there is provided a waste solution treatment apparatus which is arranged as follows. A multiplicity of vertically elongated guide chambers are formed in a waste solution container as a guide means, and a heating means is disposed in a bottom of the waste solution container. A catalyst and an ignition means are provided upwardly of the guide chambers.

The waste solution supplied to the waste solution container is dispersed to the lower ends of the multiplicity of guide chambers, volatilizes upon being heated by the heating means, and rises upward through the guide chambers. The vapor which has come out of the guide chambers is brought into contact with the catalyst and is oxidized (burnt), and is then ignited and burnt.

Upon starting of the combustion, the heat generated is transmitted downward via the waste solution container and the guide chambers by means of thermal conductance radiation, and is hence transmitted efficiently to the waste solution. Accordingly, even if the heating by the heating means is stopped, the volatilization of the waste solution continues.

Since the guide walls have large surface areas, and since a nonvolatile substance such as a toner adheres uniformly to these surfaces, there is no risk of the chambers becoming obstructed by the nonvolatile substance and hindering the generation of the vapor of the waste solution.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 1:
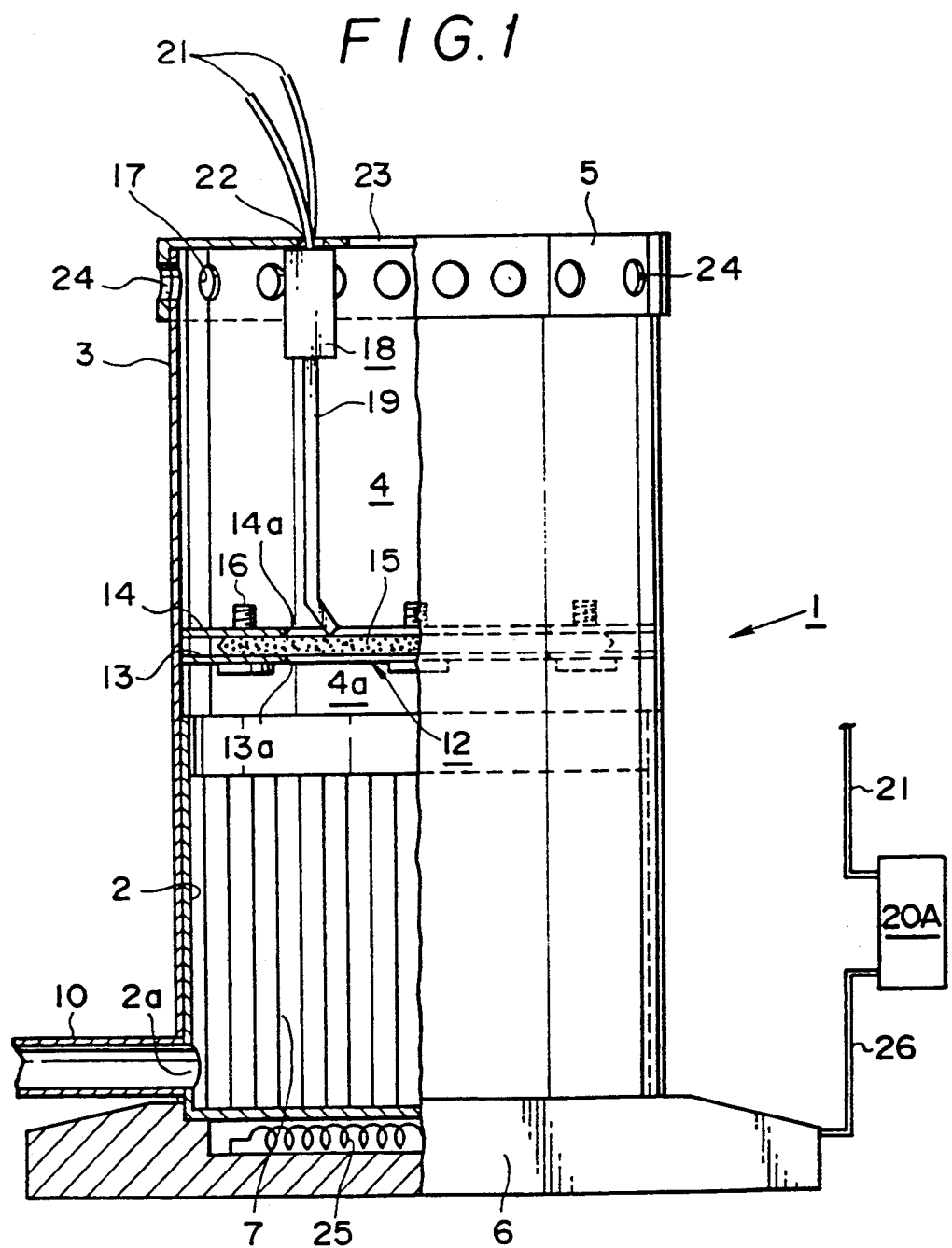
FIG. 1 is a side elevational view, one-sidedly in section, of a waste solution treatment apparatus in accordance with a first embodiment of the present invention.
Figure 2:
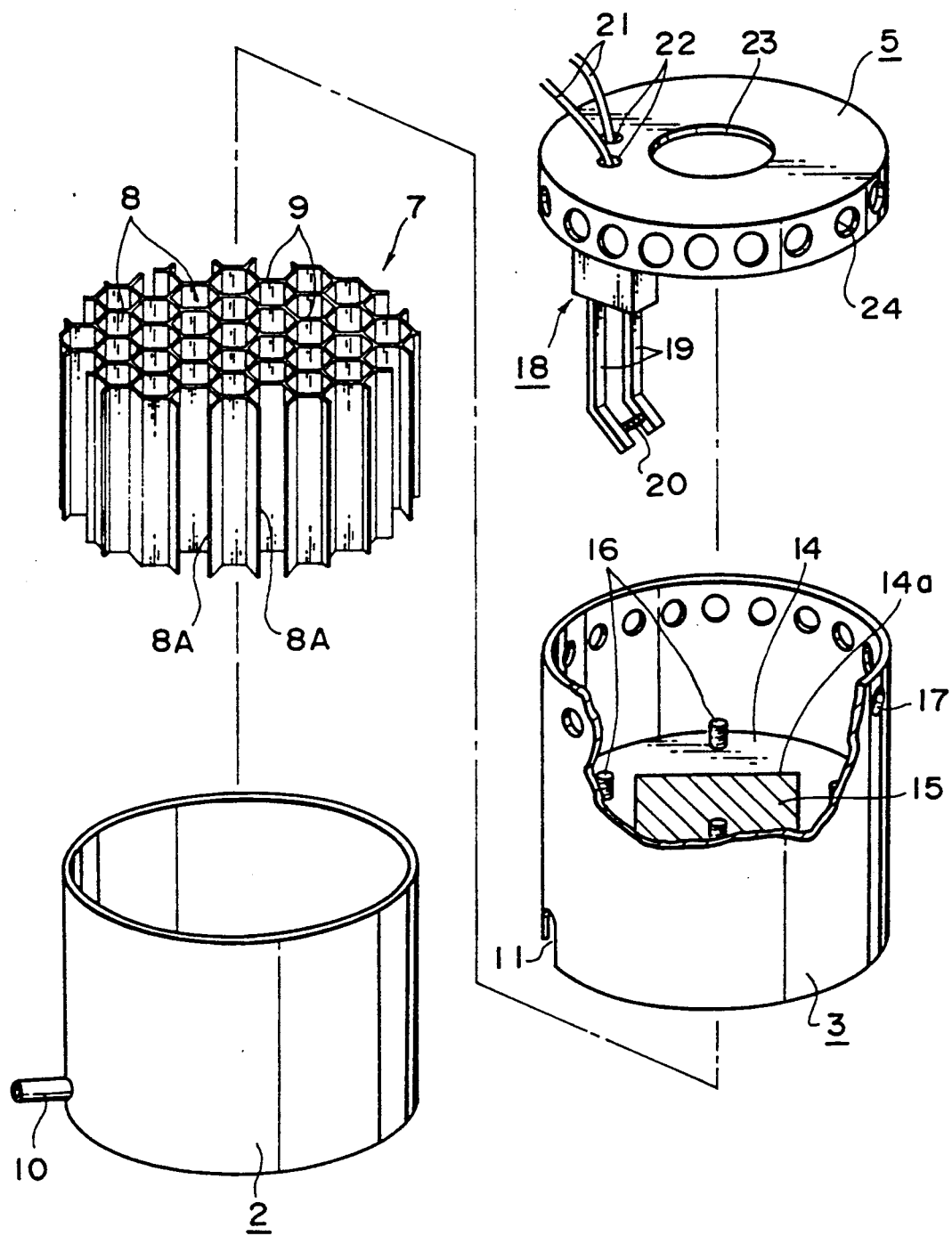
FIG. 2 is an exploded perspective view of an essential portion of FIG. 1.
Figure 3:
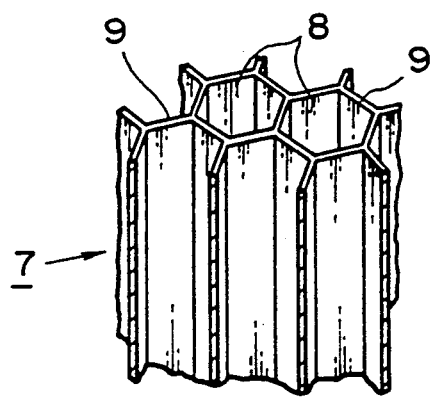
FIG. 3 is a perspective view of a part of a guide member.

FIGS. 1 to 3 illustrate a first embodiment of a waste solution treatment apparatus in accordance with the present invention. A waste solution treatment apparatus 1 of this embodiment has its entire body formed into a cylindrical configuration, and a cylindrical body 3 having open upper and lower ends is detachably inserted and fitted over a waste solution container 2 for accommodating a waste solution to be treated and having an open end. This cylindrical body is brought into close contact with a side surface of the waste solution container 2 to cover the entire side surface thereof, and a space 4 for the treatment of the waste solution is formed above the waste solution container 2. This arrangement is provided to reduce the amount of heat generated in the space 4 being diffused to the outside due to radiation and convection as well as to facilitate the conduction of this heat to inside the waste solution container 2 via the cylindrical body 3. By taking this function int consideration, the waste solution container 2 and the cylindrical body 3 are formed of a metal material, or the like having good heat conductivity. In this embodiment, the volume of the waste solution container 2 is set to approximately 150 cc.

A cover 5 is placed on top of the cylindrical body 3 in such a manner as to be rotatable in a circumferential direction and covers the upper end of the space 4.

Disposed below the waste solution container 2 is a heater 6 for heating the waste solution accommodated in the waste solution container 2, a lower end of the waste solution container 2 being inserted and set in a recess of this heater 6.

A guide member 7 having a substantially cylindrically shaped outer configuration and its interior formed into a honeycomb configuration is provided in the waste solution container 2. As most clearly shown in FIG. 2 and 3, this guide member 7 has bent guide walls 9 so as to form a multiplicity of chambers 8 each having a configuration of a regular hexagon extending vertically. By means of these guide walls 9, the interior of the waste solution container 2 is divided into the multiplicity of chambers 8 with open upper and lower ends. Accordingly, the waste solution is accommodated in the chambers 8 inside the waste solution container 2 in divided form, and the vapor of the waste solution moves to the upper end of the guide member 7 separately through the chambers 8. It should be noted that the chambers 8 on the peripheral side of the guide member 7 are in a state in which a part of the honeycomb is notched by notches 8A. These notches 8A are formed by cutting off a periphery of a large honeycomb so as to accommodate the honeycomb in the waste solution container 2.

In this embodiment, the guide walls 9 are formed of an aluminum alloy, or the like, having a thickness of about 0.1–0.2 mm, and the guide member 7 is fabricated by bending and joining a multiplicity of aluminum, or the like. The distance between the opposing faces of the chambers 8 is set to about 4–5 mm. If this distance is too small, the guide member 7 is liable to become obstructed by the nonvolatile substance contained in the waste solution, so that the distance is set to at least 1 mm or more. Nevertheless, if various conditions are taken into consideration, it is preferable, but not necessary, to set the distance to the range of this embodiment.

The guide member 7 is inserted and fitted in such a manner that its outer ends and lower end surface are respectively brought into contact with the inner peripheral surface and inner bottom surface of the waste solution container 2, and the guide member 7 is not joined to the waste solution container 2. Accordingly, very small gaps are created between the inner peripheral surface of the waste solution container 2 and the outer ends of the guide walls 9 and between the inner bottom surface of the waste solution container 2 and the lower ends of the guide walls 9, so that the chambers 8 communicate with each other through these gaps. The waste solution supplied to the waste solution container 2 can move gradually through these gaps and enter the chambers 8. The height of the guide member 7 is set in such a manner that its upper end is lower than the upper end of the waste solution container 2.

Connected to an outer peripheral surface of the waste solution container 2 is a supply pipe 10 for supplying the waste solution to the vicinity of a lower end of the waste solution container 2. The supply pipe 10 extends to the outer side of the cylindrical body 3 through a notch 11 provided in a lower end portion of the cylindrical body 3. By virtue of this arrangement, it is possible to obtain an advantage that since the notch 11 is retained by the supply pipe 10 if the cylindrical body 3 is inserted and fitted over the waste solution container 2, the cylindrical body 3 is prevented from rotating and moving relative to the waste solution container 2 even when a separate retaining means is not particularly provided.

A catalyst section 12 is provided in the cylindrical body 3 in a substantially central portion thereof. In this embodiment, a first circular support plate 13 an outer peripheral end of which is secured to the inner peripheral surface of the cylindrical body 3 and which has a rectangular window 13a in a central portion thereof and a second circular support plate 14 which is movably provided above the first support plate 13 in proximity thereto and has a rectangular window 14a are disposed in the catalyst section 12 in parallel with each other. A catalyst 15 has a tabular configuration and is clamped by the two support plates 13, 14. This catalyst 15 is tightened and secured by means of four tightening screws 16, and its upper and lower surfaces are respectively exposed on the side of the space 4 and on the side of a space 4a formed below the first support plate 13, through the windows 13a, 14a of the two support plates 13, 14. The catalyst 15 is placed on the first support plate 13 from above the cylindrical body 3, the second support plate 14 is placed thereon, and the tightening screws 16 are tightened so as to secure the catalyst 15.

The catalyst 15 can be formed by using a catalyst conventionally used for pocket heaters, e.g., a metallic catalyst of a platinum group including platinum, vanadium, and rhodium. In this embodiment, a platinum catalyst formed into a tabular configuration using as a carrier a nonvolatile substance formed of glass fibers, ceramics, or the like is used.

As shown in FIG. 1, a small gap is provided between the catalyst 15 and the upper end surface of the guide member 7, and this gap is determined depending on the the type of the waste solution to be treated as well as the type and size of the catalyst 15 used.

A plurality of holes 17 for the intake of air (oxygen) are provided at fixed intervals in an upper portion of the cylindrical body 3 in a circumferential direction.

The cover 5 has a cylindrical configuration with a bottom, and an ignition device 18 for igniting the vapor of the waste solution at the surface of the catalyst 15 is fixed to the underside of the bottom of the cover 5. This ignition device 18 is composed of an electrical heater in this embodiment, and a filament 20 disposed at the lower ends of a pair of arms 19 extending downward from a main body portion is arranged in such a manner as to abut against the surface of the catalyst 15. A pair of lead wires 21 which leads to a controller 20A including a power source for the ignition device 18 are led outside the cover 5 through a pair of holes 22 provided in the cover 5. In addition, a large hole 23 for exhaust gases is provided in the center of the cover 5.

A plurality of holes 24 for the intake of air (oxygen) are provided at fixed intervals in the side surface portion of the cover 5 in a circumferential direction. The number of these holes 24 is the same as that of the holes 17 provided in the cylindrical body 3, and these holes 24, 17 are arranged in such a manner as to be superposed on each other when the cover 5 is fitted. Accordingly, if the cover 5 is rotated slightly around its central axis relative to the cylindrical body 3, the degree of superposition of the holes 24, 17 changes, whereby the amount of air (oxygen) supplied to the space 4 can be adjusted.

It should be noted that reference numeral 25 denotes a filament for the heater 6, and a lead wire 26 is connected to the controller 20A.

The state of use of the waste solution treatment apparatus 1 having the above-described arrangement will now be described by citing as an example a case in which an excess developing solution for an electrophotographic system is treated. This developing solution uses as its solvent isoparaffin ($C_{10}H_{22}$-$C_{12}H_{26}$) which has high electrical insulation characteristics, and a toner comprising carbon black having a diameter of 0.3 $\mu$m or thereabouts and fine particles of a fixing polymer is mixed with a dispersion polymer therein. These nonvolatile components are typically contained by about 0.1 wt. % with respect to the entire liquid, and is contained by 0.02–0.5 wt. % depending on the types.

First, the developing solution to be treated is supplied to the waste solution container 2 via the supply pipe 10. Since the overall interior of the guide member 7 is divided into the plurality of chambers 8, as described above, the developing solution which has reached an opening 2a of the waste solution container 2 is supplied immediately to the chambers 8 facing the opening 2a, but is not supplied immediately to the other chambers 8 by being obstructed by the guide walls 9. The developing solution is supplied to the other chambers 8 at a very slow speed via the gaps formed between the outer ends of the guide walls 9 and the inner bottom surface of the waste solution container 2 and between the lower ends of the guide walls 9 and the inner bottom surface of the waste solution container 2.

It is necessary for the amount of the developing solution supplied not to exceed the upper ends of the guide walls 9. The reason for this is as follows: If the amount of supply is excessive and the lower surface of the catalyst 15 is brought into contact with the developing solution, the oxidation (combustion) of the developing solution by the catalyst 15 becomes impossible. Also, even if the amount of supply is not excessive to that extent, if the level of the developing solution exceeds the upper ends of the guide walls 9, the advantage of dividing the developing solution into the chambers 8 by means of the guide walls 7 is lost.

By virtue of this arrangement, there is an advantage in that it is possible to eliminate the risk of disturbing the temperature distribution of the developing solution when the developing solution inside the waste solution container 2 is agitated by the newly supplied developing solution. If the temperature distribution of the developing solution is disturbed, the state of volatilization of a volatile component in the developing solution is also disturbed, so that the state of combustion of the vapor is not kept constant. Hence, this is a significant advantage.

Next, in order to facilitate the volatilization of the developing solution, the heater 6 is energized to heat the developing solution inside the waste solution container 2. The heating temperature at this juncture is generally set to about 50° C. although it varies depending on the type of waste solution. When the temperature rises by heating, the vapor of the developing solution is produced in large quantities, so that the vapor of the developing solution inside the chambers 8 rises along the guide walls 9 and reaches the space 4a below the catalyst section 12. Thus, the density of the vapor inside the space 4a increases, and part of the vapor is brought into contact with the surface of the catalyst 15.

In this state, if the ignition device is energized to heat the filament 20, the catalyst 15 is ignited. Since a large quantity of oxygen remains adsorbed by the catalyst 15 in an activated state, the vapor of the developing solution is coupled with this oxygen, thereby undergoing oxidation and generating heat.

The oxygen necessary for oxidation (combustion) is supplied to the space 4 through the holes 17, 23 for the intake of air, and combustion gases (mainly carbon dioxide and steam) generated by combustion are exhausted outside the space 4 via the holes 23 for the exhaust gases. When the quantity of vapor inside the space 4a decreases due to combustion, the vapor pressure inside the space 4a drops, so that the vapor of the waste solution is supplied automatically through the chambers 8.

The catalyst 15 only serves to facilitate the oxidation reaction of the vapor of the waste solution, and the catalyst 15 itself undergoes no change by oxidation, so that it can be used for extended periods of time without being replaced.

When the catalyst 15 is ignited as described above, the power source of the heater 6 is turned off. Nevertheless, since the waste solution is heated by the combustion heat, the combustion of the vapor is continued even if the heater 6 is turned off.

When all the developing solution is thus treated, nonvolatile substances including a toner remains in the waste solution container 2. As for these nonvolatile substances, it suffices when a certain quantity of these nonvolatile substances has accumulated, these nonvolatile substances are disposed of after the cylindrical body 3 is withdrawn from the waste solution container 2 and the guide member 7 is removed from the waste solution container 2.

Although, in the above-described embodiment, the guide walls 9 of the guide member 7 are formed into a honeycomb configuration to make all the chambers 8 independent, the chambers 8 need not necessarily be formed independently. For instance, some of the adjacent chambers 8 of the guide member 7 may be made to communicate with each other by providing holes or the like in some of the guide walls 9. In addition, the lower end of each of the chambers 8 need not necessarily be open insofar as the upper end thereof is open. However, it is preferred that the lower end of each of the chambers 8 is open so that the movement of the waste solution to each of the chambers 8 is carried out smoothly.

As is apparent from the forgoing description, this embodiment exhibits the following outstanding advantages:

Since the oxidation by the catalyst 15 is carried out inside the space 4 restricted by the cylindrical body 3, and the guide walls 9 extending vertically inside the waste solution container 2 are provided, heat generated by the oxidation of the vapor of the waste solution is transmitted very efficiently to the waste solution in the waste solution container 2, facilitating the production of the vapor. In addition, nonvolatile components contained in the waste solution adhere uniformly to the guide walls 9 having large surface areas immersed in the waste solution. Accordingly, even in the case of a waste solution which contains a nonvolatile component and is difficult to volatilize at normal temperatures as in the case of the above-described developing solutions, it is possible to effect treatment continuously without causing any loading of the guide member 7.

In addition, since the heat generated by the catalyst 15 is transmitted very efficiently to the waste solution, if the catalyst is ignited by the ignition device 18 at the time of the starting of treatment, the waste solution can be subsequently heated automatically by the heat generated by oxidation. For this reason, it is unnecessary to heat the waste solution continuously during the treatment of the waste solution, and it is possible to burn even those components of a high boiling point in the waste solution that have hitherto tended to remain after combustion.

Since the waste solution treatment apparatus of this embodiment mainly comprises the waste solution container 2, the cylindrical body 3, and the heater 6 and has a very simple arrangement, the apparatus can be fabricated in compact form and can be easily accommodated in the body of an electrophotographic system or the like.

Since the arrangement is such that the guide walls 9 extending vertically are provided in the waste solution 2 to accommodate the waste solution in the plurality of chambers 8 in divided form, and the chambers 8 communicate with each other so allow the waste solution to be supplied gradually, even if the waste solution is newly supplied during treatment of the waste solution, the new waste solution is prevented from being supplied immediately to the chambers 8. Consequently, even if the waste solution is newly supplied during the treatment of the waste solution, the temperature of the waste solution in the waste solution container 2 does not fluctuate substantially, causing no adverse effects on the treatment of the waste solution.

Figure 4:
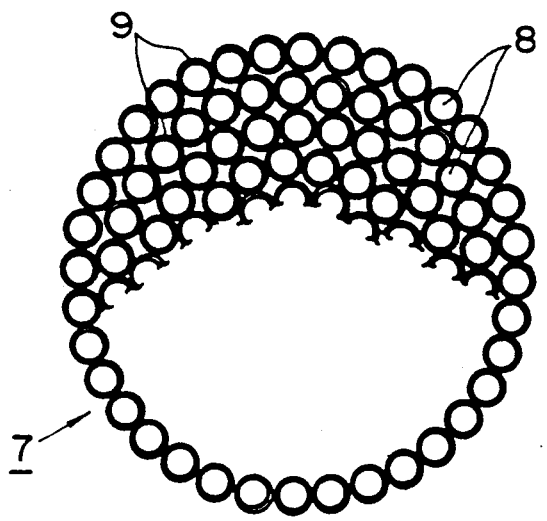
FIG. 4 is a top plan view illustrating a guide member in accordance with a second embodiment.

FIG. 4 illustrates a second embodiment of the present invention. In this embodiment, a plurality of chambers 8 each having a circular section are formed by integrally connecting together a multiplicity of circular pipes. In this case, in order to prevent the loading of the chambers 8, the diameter of each of the circular pipes is preferably set to 1 mm or more.

If the function of the aforementioned guide member 7 is taken into consideration, it is sufficient if the interior of the waste solution container 2 is divided into the multiplicity of chambers 8 by means of the guide walls 9 to ensure that the state of generation of the vapor of the waste solution is not disturbed by the waste solution newly supplied to the waste solution container 2 and that the heat generated in the space 4 by the oxidation of the vapor of the waste solution is transmitted to the waste solution in the waste solution container 2 without waste. In order to further improve thermal conductivity, the guide member 7 is preferably formed of thin metal plates having good thermal conductivity.

Figure 5:
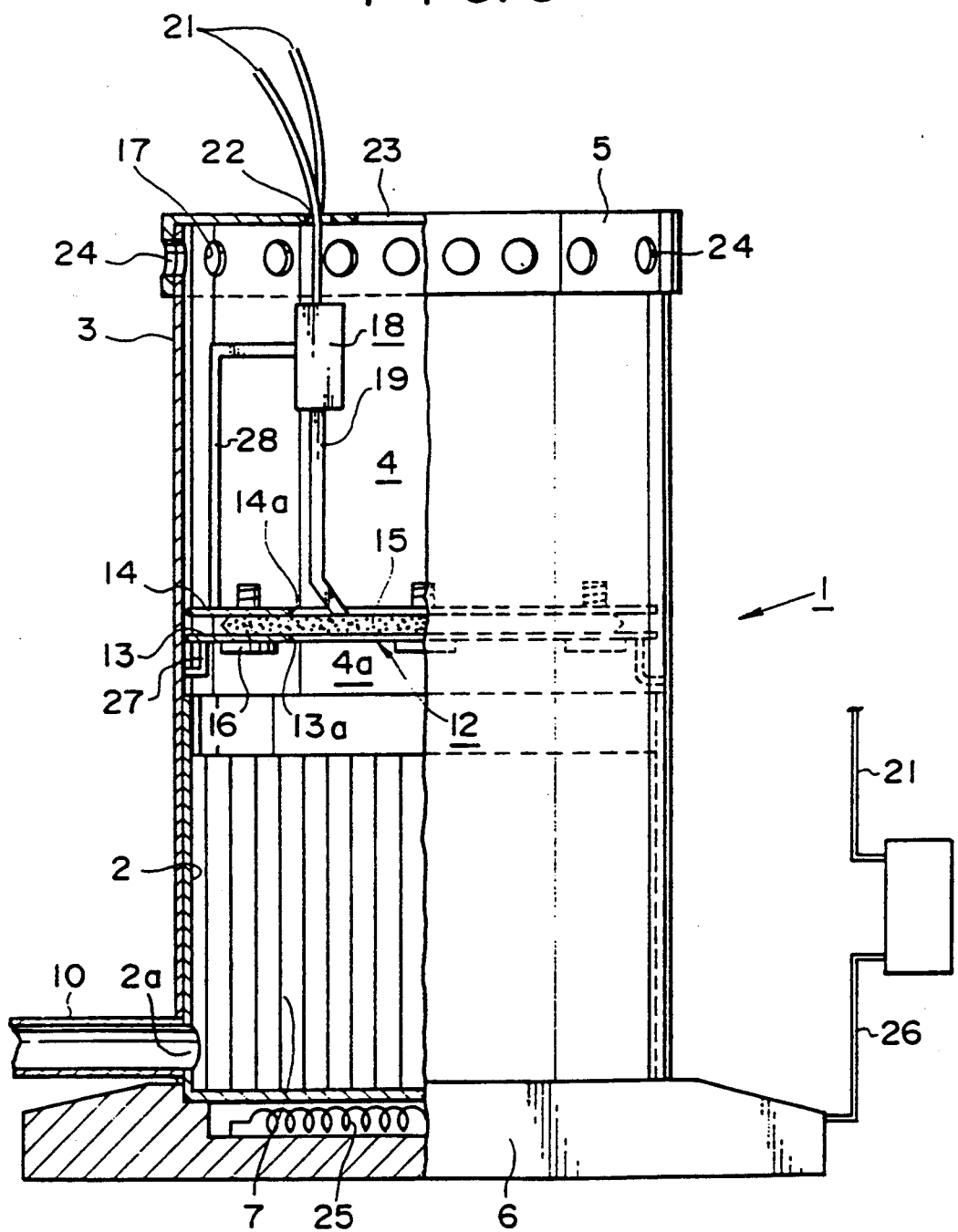
FIG. 5 is a side elevational view, one-sidedly in section, of a waste solution treatment apparatus in accordance with a third embodiment.

FIG. 5 illustrates a third embodiment of the present invention. In this third embodiment, the first support plate 13 for supporting the catalyst 15 is fixed to the inner peripheral wall of the cylindrical body 3 by means of a plurality of L-shaped support rods 27 formed of a wire made of a shape memory alloy. The catalyst 15 is clamped by the first support plate 13 and the second support plate 14 and is tightened and secured by means of the tightening screws 16 in the same way as the first embodiment. When the temperature of the space 4 rises and reaches a predetermined upper temperature, the support rods 27 are elongated linearly, thereby moving the catalyst 15 upward. Conversely, when the temperature drops and reaches a predetermined lower temperature, the support rods 27 are bent into an L-shape, thereby moving the catalyst 15 downward.

In addition, since the catalyst 15 moves vertically, the ignition device 18 is secured to the second support plate 14 by means of a column 28 to ensure that the filament 20 is constantly brought into close contact with with the catalyst 15.

In this third embodiment, since the catalyst 15 moves vertically in response to fluctuations in the temperature of the space 4, when the quantity of vapor of the waste solution is too much and the amount of heat generated by the catalyst 15 hence becomes excessive, causing the temperature of the space 4 to rise above a certain limit, the support rods become elongated, which increases the distance between the catalyst 15 and the surface of the waste solution, thereby automatically reducing the amount of heat applied to the waste solution. In addition, when the temperature of the space 4 thereby drops, the support rods 27 are bent again, with the result that the distance between the catalyst 15 and the surface of the waste solution is reduced, thereby automatically increasing the amount of heat applied to the waste solution.

Thus, in the third embodiment, there is an advantage in that the temperature of the space 4 can be automatically maintained within a fixed range.

Figure 6:
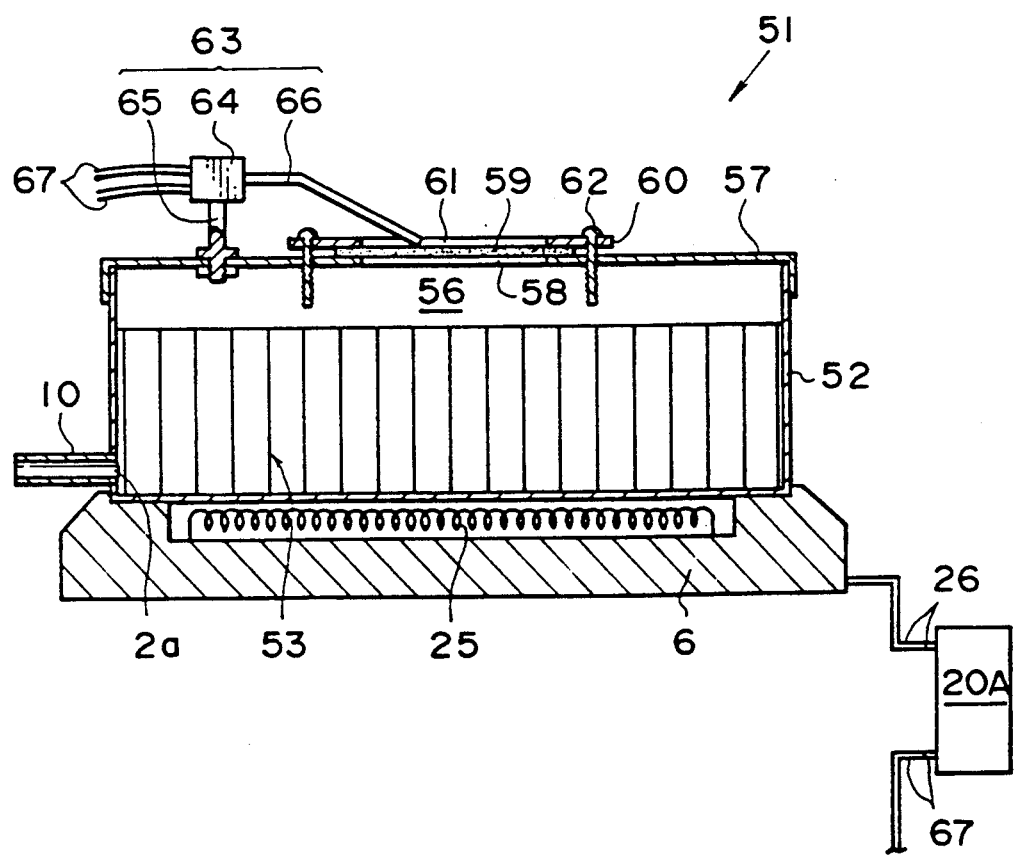
FIG. 6 is a vertical sectional view illustrating a waste solution treatment apparatus in accordance with a fourth embodiment.
Figure 7:
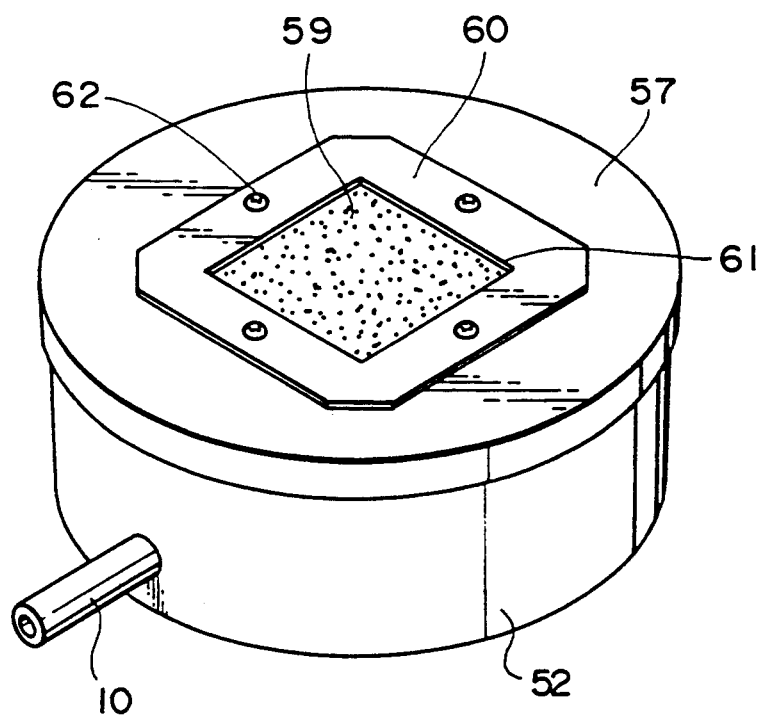
FIG. 7 is a perspective view of the waste solution treatment apparatus in accordance with the fourth embodiment.
Figure 8:
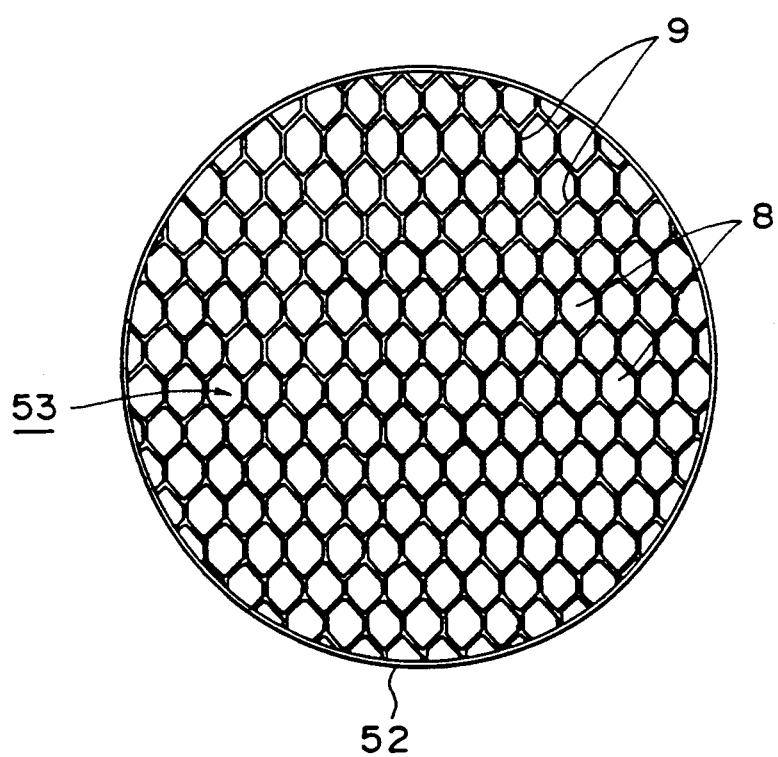
FIG. 8 is a top plan view of a waste solution container in accordance with the fourth embodiment.

FIGS. 6 to 8 illustrate a fourth embodiment of the present invention. In waste solution treatment apparatus 51 of this embodiment, a waste solution container 52 for accommodating a waste solution to be treated is provided with a configuration of a cylinder with its horizontal dimension greater than its vertical dimension and with an open upper end.

A honeycomb-shaped guide member 53 which is similar to that of the first embodiment is provided in the waste solution 52.

A space 56 formed between the upper end of this guide member 53 and a ceiling portion of the waste solution container 52 also has configuration with its horizontal dimension greater than its vertical dimension.

A cover 57 is detachably provided on an upper end of the waste solution container 52, and is adapted to close an upper opening of the waste solution container 52. The cover 57 is formed into a tabular configuration, and a rectangular hole 58 is provided in a central portion thereof.

A catalyst 59 formed into a tabular configuration is provided on a central portion of an upper surface of the cover 57. This catalyst 59 is retained by being pressed onto the upper surface of the cover 57 by means of a tabular holder 60. An upper surface of the catalyst 59 is exposed through a rectangular window 61 similar to the rectangular hole 58 of the cover 57 provided on the holder 60. A lower surface of the catalyst 59 is exposed to the space 56 through the rectangular hole 58 of the cover 57. Since the holder 60 is fixed to the cover 57 by means of four screws 62, if the holder 60 is removed, the replacement of the catalyst 59 can carried out easily.

An ignition device 63 for igniting the catalyst 59 is further provided on the upper surface of the cover 57. In this embodiment, an electric heater is used as the ignition device 63, and a body portion 64 is rotatably provided on the cover 57 by means a column 65. A filament (not shown) is provided on the tips of a pair of flexible arms 66 extending from one surface of the body portion 64 to the vicinity of the catalyst 59, and a pair of lead wires 67 led to the controller 20A is connected to the other surface of the body portion 64.

This ignition device 63 is arranged as follows: At the time of installation or replacement of the catalyst 59, the body portion 64 is rotated within a horizontal plane with the column 65 as an axis while the arms 66 are being bent upward, thereby separating the filament from the catalyst 59. After completion of installation or replacement, the body portion 64 is rotated again in the opposite direction, thereby brining the filament into proximity to the catalyst.

A heater 6 is which is similar to that of the first embodiment is provided below the waste solution container 52.

Furthermore, as in the case of the first embodiment, a supply pipe 10 for supplying the waste solution to the vicinity of a lower end of the waste solution container 52 is connected to a side surface of the waste solution container 52.

A description will now be given of the operation of this embodiment in a case where the apparatus is used in the same conditions as those of the first embodiment.

First, a developing solution to be treated is supplied to the waste solution container 52 through the supply pipe 10. This developing solution is supplied gradually to a lower end of each of the chambers 8 where the developing solution vaporizes by being heated by the heater 6, and then the vapor reaches the space 56. Thus, the density of vapor in the space 56 increases, and part of the vapor is brought into contact with the surface of the catalyst 59.

In this state, if the ignition device 63 is energized to heat the filament, the catalyst 59 is ignited. Since a large quantity of oxygen remains adsorbed by the catalyst 59 in an activated state, the vapor of the developing solution is coupled with this oxygen, thereby undergoing oxidation and generating heat.

Since the upper surface of the catalyst 59 is exposed to the outside through the window 61 of the holder 60, the oxygen necessary for oxidation (combustion) can be supplied easily and sufficiently from the ambient air, while combustion gases (mainly carbon dioxide and steam) generated by combustion are diffused immediately to the outside. Meanwhile, the heat generated by oxidation is easily diffused to the outside as radiation heat. Since the amount of heat thus radiated is substantially determined by the temperature of a high temperature-side object, the apparatus is less susceptible to the influence of the outside air temperature as compared with a case where heat is transferred by convection or conductance.

In this embodiment as well, after the catalyst 59 is ignited, the waste solution is automatically heated by the heat generated by the catalyst 59, so that the power source of the heater 6 is turned off. In addition, since the distance between the catalyst 59 and the surface of the waste solution accommodated in the waste solution container 52 is set to a fairly small level, the transmission of heat is mostly effected by radiation, and the state of heating the waste solution is less susceptible to the influence of the ambient temperature.

Figure 9:
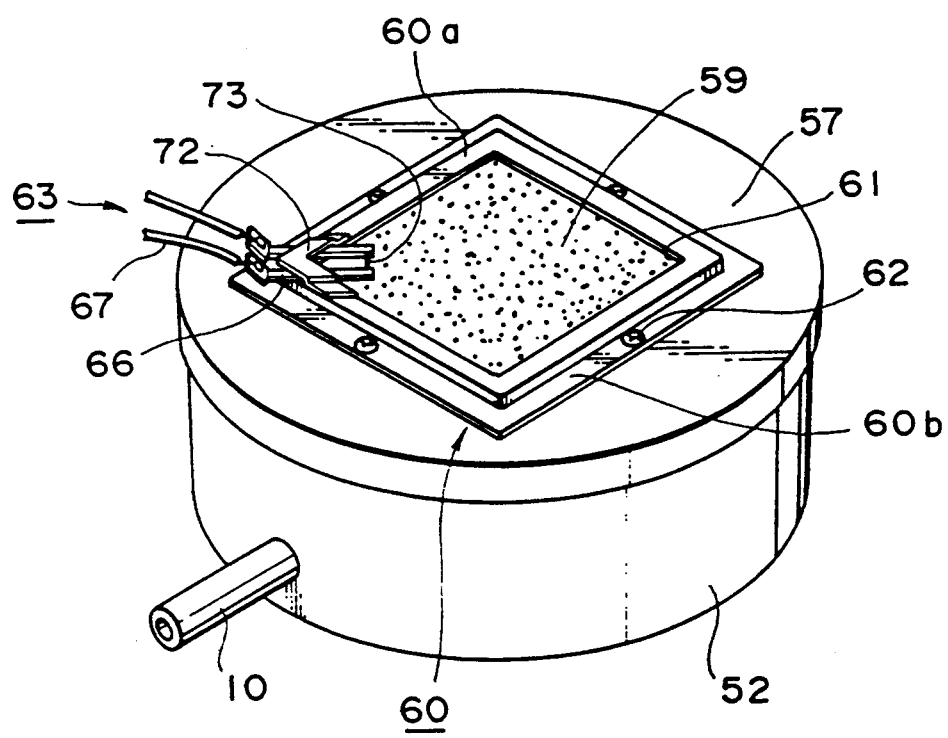
FIG. 9 is a perspective view illustrating a waste solution treatment apparatus in accordance with a fifth embodiment.

FIG. 9 illustrates a fifth embodiment of the present invention.

In this fifth embodiment, only the holder 60 and the ignition device 63 differ from those of the fourth embodiment. In the fourth embodiment, although the holder 60 has a tabular configuration, in the fifth embodiment, an inner peripheral edge portion 60a of the holder 60 on the side of the window 61 is bent and rises upwardly of an outer peripheral edge portion 60b of the holder 60, and the catalyst 59 is accommodated by being pressed by the inner peripheral edge portion 60a and the cover 57. Consequently, an advantage is obtained in that it is possible to eliminate the risk of a gap being formed between the catalyst 59 and the cover 57 and the catalyst 59 being pressed too strongly.

In addition, the ignition device 63 is secured to the inner peripheral edge portion 60a of the holder 60 as its pair of arms 66 are pressed and held by a fixing member 72. A filament 73 is fixed to the tips of the pair of arms 66, while a pair of lead wires 67 are connected to proximal ends of the pair of arms 66. For this reason, at the same time as the holder 60 is attached or removed, the ignition device 63 can also be attached or removed.

Figure 10:
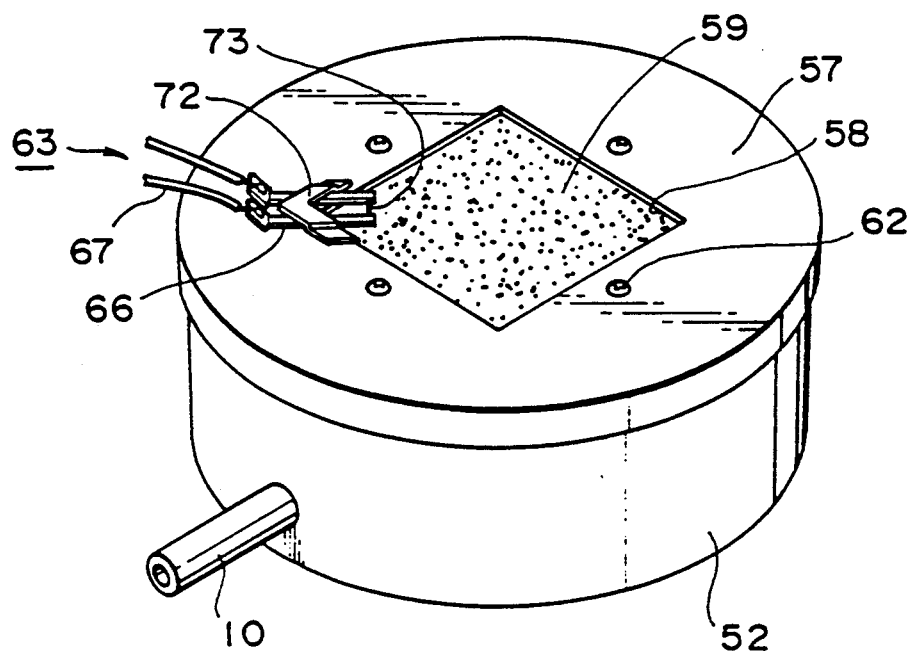
FIG. 10 is a perspective view illustrating a waste solution treatment apparatus in accordance with a sixth embodiment.
Figure 11:
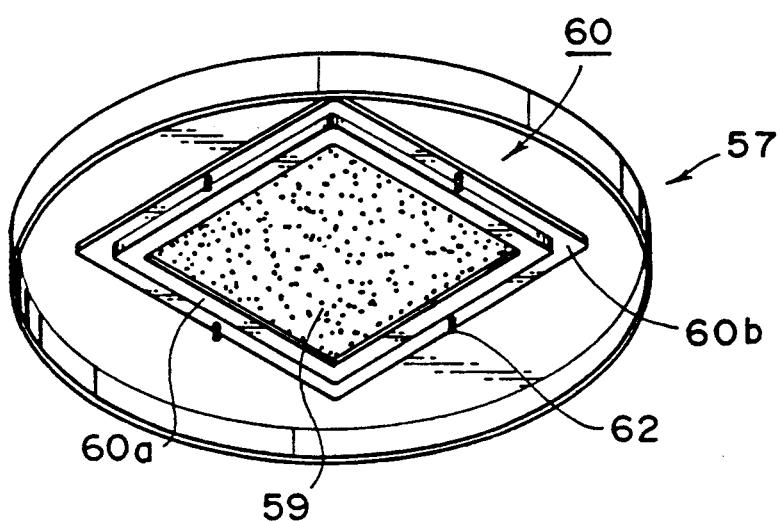
FIG. 11 is a perspective view illustrating a rear side of a cover in accordance with the sixth embodiment.

FIGS. 10 and 11 illustrate a sixth embodiment of the present invention. In this sixth embodiment, the same ignition device 63 as that of the fifth embodiment is directly fixed to the upper surface of the cover 57, and the catalyst is attached to the lower surface of the cover 57. Although the holder 60 is the same as as that of the fifth embodiment, since the catalyst 59 is pressed and held by the lower surface of the cover 57, the catalyst 59 is disposed inside the waste solution container 52, and its surface is seen only through the window 58 from the outside. Thus, the catalyst 59 can be disposed on either the inner or outer side of the cover 57.

As is apparent from the foregoing description, the apparatus in accordance with the above-described embodiments display the following outstanding advantages:

Since the distance between the catalyst 59 and the surface of the waste solution accommodated in the waste solution container 52 is small, and most of the heat generated by the catalyst 59 is transmitted efficiently to the waste solution by radiation, the amount of heat transmitted to the waste solution does not substantially change due to the ambient temperature. In addition, since the surface of the waste solution in the waste solution container 52 does not drop substantially, the range of variation of the amount of heat transmitted to the waste solution is small.

Accordingly, the amount of heating is difficult to change not only by the ambient temperature of the waste solution container 52 but by the quantity of the waste solution, so that a stable state of combustion (oxidation) can be constantly maintained for the catalyst 59.

Since the upper surface of the catalyst 59 is exposed to the outside of the waste solution container 52, and the oxygen necessary for combustion of the waste solution can be supplied easily and sufficiently from the surroundings of the waste solution container 52, even when the ambient temperature is fairly higher than normal temperatures, incomplete combustion is unlikely to take place, and the risk of giving rise to foul odors due to the combustion of the waste solution is small.

Furthermore, as an advantage of the catalyst 59, which is a high-temperature portion, being exposed, it is possible to cite the fact that the apparatus is less subjected to the effect of the outside air temperature since the ratio of radiation heat to the entire amount of heat emitted to the outside increases.

Even when the quantity of the waste solution in the waste solution container 52 becomes very small when the ambient temperature is low, the heating of the waste solution is conducted efficiently. Therefore, there is no risk of the combustion by the catalyst 59 being stopped due to a shortage of the vapor of the waste solution.

The waste solution treatment apparatus 51 shown in FIG. 6 and the waste solution treatment apparatus 1 shown in FIG. 1 were actually fabricated, and a comparative experiment on the state of combustion was conducted by changing the ambient temperature.

The waste solution treatment apparatus 51 was fabricated into the configuration shown in FIG. 6. The waste solution container 52 was formed into a configuration of a cylinder having a diameter of 80 mm and a height of 35 mm. The cover 57 was provided on the upper end of the waste solution container 52, and the upper and lower exposed surfaces (the hole 58 of the cover 57 and the window 61 of the holder 60) of the catalyst 59 provided in a central portion of the cover were set to a square a side of which has a length of 35 mm.

The waste solution treatment apparatus 1 was fabricated into the configuration shown in FIG. 1. The waste solution container 2 was formed into a configuration of a cylinder having a diameter of 64 mm. The cylindrical body 3 was fitted over the outside of the waste solution container 2, and the catalyst 15 was disposed at a position which was 60 mm high from the bottom surface of the waste solution container 2. The material and configuration of the catalyst 15 and the sizes and configurations of the support plates 13, 14 and the windows 13a, 14a were the same as those of the apparatus 51 of the invention.

Method of Experiment and Results

The ambient temperature was kept at 15° C., and 100 cc of the aforementioned developing solution for electrophotography was accommodated in each of the waste solution containers 2, 52, and was burnt.

In the apparatus 51, all the waste solution was burnt, but 25 cc of waste solution remained in the apparatus 1.

The ambient temperature was set to 30° C., and when the concentration of unburnt gases contained in exhaust gases after combustion, the concentration for the apparatus 51 was 30 ppm, while the concentration for the apparatus 1 was 50 ppm.

As a result, it was verified that the apparatus 51 is capable of undergoing more stable combustion than the apparatus 1 even when the ambient temperature changes.

Figure 12:
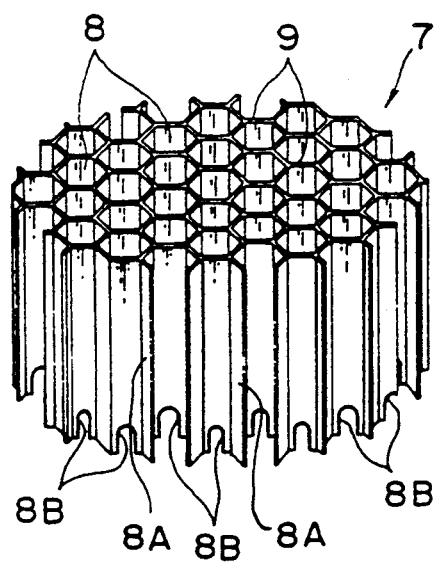
FIG. 12 is a perspective view illustrating a guide member in accordance with a seventh embodiment.

FIG. 12 illustrates a seventh embodiment of the present invention. In this embodiment, notches 8B are formed at lower ends of the side walls 9 to allow the chambers 8 of the guide member 7 to communicate with each other. These notches 8B serve as inlet portions for the developing solution. The size and position of each of the notches 8B can be changed arbitrarily. For instance, the notches 8B may be circular notches formed in the side walls 9 of the guide member 7.

What is claimed is:

1. A waste solution treatment apparatus comprising:
   a waste solution container and mans for supplying a waste solution to said container;
   heating means provided below said container for vaporizing a portion of said waste solution supplied to said container;
   a catalyst for catalyzing said vaporized portion of said waste solution;
   an igniter for igniting said vaporized waste solution and having a portion adjacent to said catalyst;
   guide means comprising a plurality of hollow, elongated, open ended chamber located within said container and partially immersed in said waste solution, said guide means being disposed vertically between said heating means and said catalyst, for guiding said vaporized waste solution to said catalyst and for transmitting heat generated at said catalyst to said waste solution thereby maintaining the temperature of said waste solution; and
   an air intake means provided for said waste solution container, above said catalyst, for supplying air to said catalyst.

2. A waste solution treatment apparatus as recited in claim 1, further comprising:
   control means for controlling said heating means, said control means turning said heating means off when said vaporized waste solution is ignited.

3. A waste solution treatment apparatus as recited in claim 1, wherein said heating means is also a base for supporting said waste solution container.

4. A waste solution treatment apparatus as recited in claim 1, wherein said guide means exhibits a honeycomb configuration in cross section.

5. A waste solution treatment apparatus as recited in claim 1, wherein at least one outermost, peripheral chamber of said guide means is partially cut away, said waste solution and said vapor passing between said partially cut away chamber of said guide means and said waste solution container.

6. A waste solution treatment apparatus as recited in claim 1, wherein said catalyst is sandwiched between a pair of plates, said pair of plates being supported above said waste solution container.

7. A waste solution treatment apparatus as recited in claim 1, wherein said igniter is positioned adjacent to a side of said catalyst opposite said guide means.

8. A waste solution treatment apparatus as recited in claim 1, further comprising a separate, removable cover.

9. A waste solution treatment apparatus as recited in claim 8, wherein said igniter is supported by said cover.

10. A waste solution treatment apparatus as recited in claim 1, further comprising air supply adjusting means for adjusting an amount of said air supplied through said air intake means to said catalyst.

11. A waste solution treatment apparatus as recited in claim 10, wherein said air supply adjusting means comprises a cover, said cover including apertures along a peripheral side wall thereof, said apertures being aligned with said air intake means for allowing a maximum amount of air to reach said catalyst.

12. A waste solution treatment apparatus as recited in claim 1, wherein at least one notch is formed at a bottom portion of at least one of said chamber, said waste solution being communicated through said at least one notch and between said at least one of said chambers and an adjacent chamber.

13. A waste solution treatment apparatus as recited in claim 12, wherein said at least one notch is of inverted U-shape.

14. A waste solution treatment apparatus as recited in claim 1, said waste solution container comprising an open ended, cylindrical sleeve and a separate, cylindrical base portion, said sleeve supporting said catalyst, said base portion containing said guide means and said waste solution, wherein said sleeve fits slidably over said base portion and is removable therefrom for accessing said guide means.

15. A waste solution treatment apparatus as recited in claim 14, wherein said sleeve is provided with a detachable, rotatably supported cover, said cover supporting said igniter.

16. A waste solution treatment apparatus as recited in claim 15, wherein said means for supplying said waste solution to said container comprises an inlet pipe.

17. A waste solution treatment apparatus as recited in claim 16, wherein said sleeve is provided with a slot at a lower end thereof, said slot communicating with said inlet pipe to prevent rotation between said sleeve and said base portion.

18. A waste solution treatment apparatus according to claim 1, further comprising adjusting means for adjusting the relative interval between said catalyst and said guide means for expanding the interval therebetween as the temperature of said catalyst rises.

* * * * *

UNITED STATES PATENT AND TRADEMARK OFFICE
CERTIFICATE OF CORRECTION

PATENT NO. : 5,294,406
DATED : March 15, 1994
INVENTOR(S) : Masayasu Sekido et al It is certified that error appears in the above-indentified patent and that said Letters Patent is hereby corrected as shown below:

On the title page, item [75] Inventors: the second inventor's address, delete "Kaisei, Japan" and insert --Kanagawa, Japan--.

Signed and Sealed this

First Day of November, 1994

Attest:

BRUCE LEHMAN

*Attesting Officer*  *Commissioner of Patents and Trademarks*